S. E. WILBERGER.
AUXILIARY AIR INLET DEVICE FOR INTERNAL COMBUSTION ENGINES.
APPLICATION FILED MAR. 28, 1914.
1,207,111.
Patented Dec. 5, 1916.
2 SHEETS—SHEET 1.
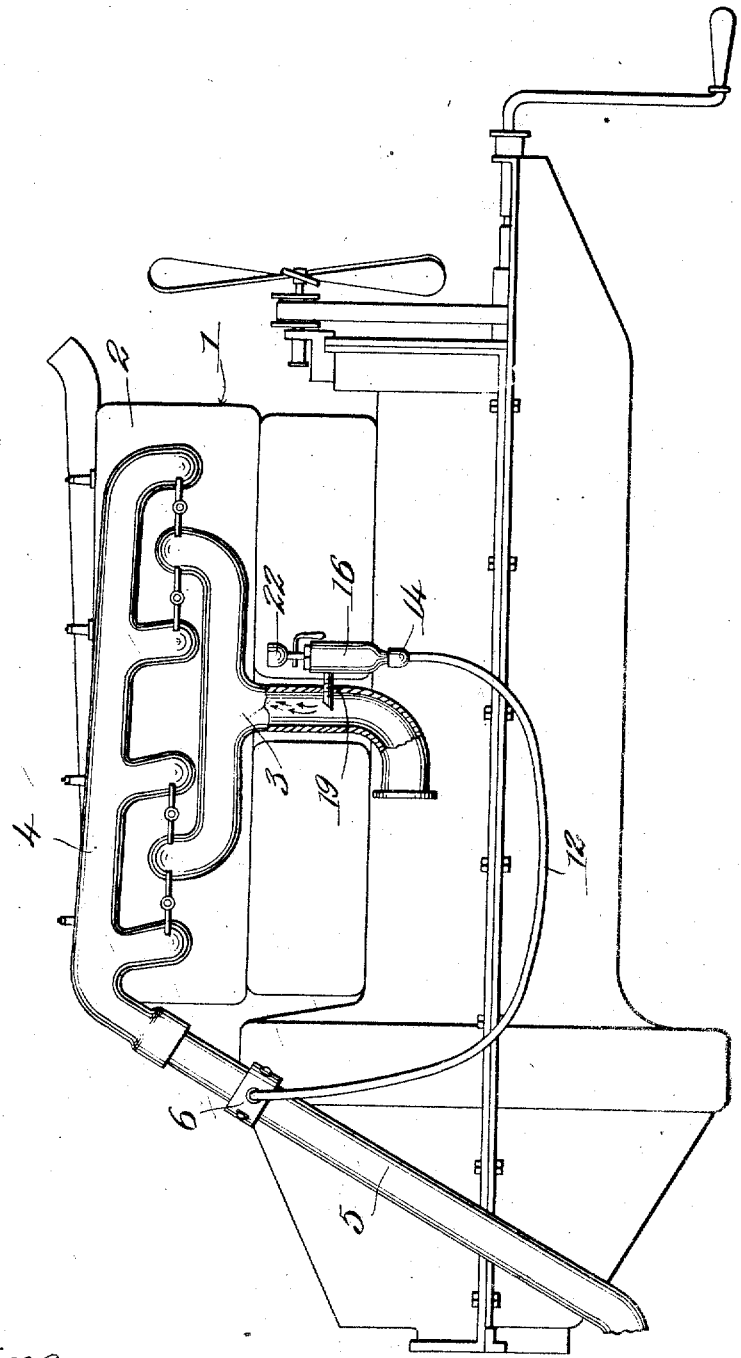

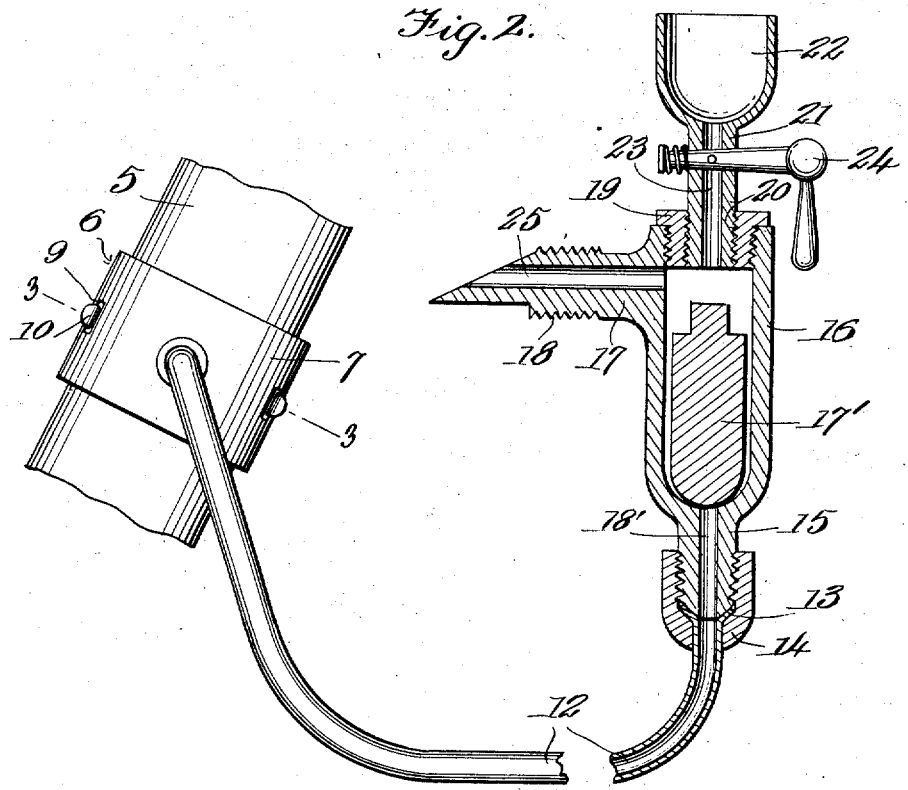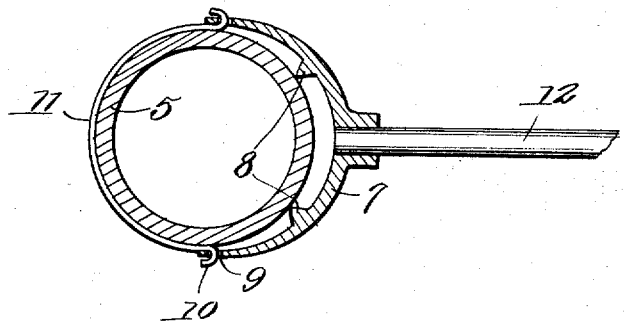

UNITED STATES PATENT OFFICE.

STERLING E. WILBERGER, OF JULIAN, NEBRASKA.

AUXILIARY-AIR-INLET DEVICE FOR INTERNAL-COMBUSTION ENGINES.

1,207,111. Specification of Letters Patent. Patented Dec. 5, 1916.

Application filed March 28, 1914. Serial No. 827,999.

*To all whom it may concern:*

Be it known that I, STERLING E. WILBERGER, citizen of the United States, residing at Julian, in the county of Nemaha and State of Nebraska, have invented certain new and useful Improvements in Auxiliary-Air-Inlet Devices for Internal-Combustion Engines, of which the following is a specification.

My invention is designed to facilitate the combustion of liquid hydro-carbons in internal combustion engines when the latter are subjected to subnormal temperatures which tend to retard and minimize such combustion.

An object of the invention is to provide simple and effective means for heating both the air and fuel supplied to the engine, to the temperature required for most effective combustion, despite adverse atmospheric conditions; such means being attachable and detachable as an accessory to automobile engines of ordinary construction.

A further object of the invention contemplates means operating in conjunction with the intake manifold of the engine to supply thereto an auxiliary charge of heated air at each impulse of the engine piston, said auxiliary air supply commingling with the combustible mixture prior to its passage into the engine cylinder.

The invention as a still further object, aims to provide means including a novel form of heater, so arranged with respect to the exhaust conduit of the engine as to utilize the high temperature of the exhaust or spent gases to heat the auxiliary air supply prior to its suction into the intake manifold.

The above and additional objects are accomplished by such means as are illustrated in their preferred embodiment in the accompanying drawings, described in the following specification and then more particularly pointed out in the claim.

In describing my invention in detail reference will be had to the accompanying drawings wherein like characters denote like or corresponding parts thruoghout the several views, and in which:—

Figure 1 is a side elevation illustrating the application of the invention; Fig. 2 is an enlarged longitudinal sectional view of the attachment, the heater and a portion of the air conduit being shown in elevation; and Fig. 3 is a section on the line 3—3 of Fig. 2.

Before proceeding with the description of the drawings, I desire to call particular attention to the fact that while I have evolved my invention with reference to its application in connection with automobile engines, the same may be readily utilized as an accessory to internal combustion engines varying in type.

Referring now to the drawings by numerals, 1 designates as an entirety an ordinary multi-cylinder automobile engine, the same comprising in addition to the cylinders 2 the usual intake manifold 3, exhaust manifold 4 and exhaust conduit 5.

A heater, designated as an entirety by the numeral 6 is designed for attachment to the exhaust conduit 5 of the engine, said heater comprising an arcuate or substantially semicircular plate member 7 disposed to partially encircle the conduit 5, it being held in spaced relation thereto through the medium of lugs or projections 8 formed integrally with and upon the inner periphery of said plate. Openings 9 are formed in the respective terminals of said plate, through which curved extensions 10 of a suitable band 11 extend, the said band, as is illustrated to advantage in Fig. 3 of the drawings, serving as a fastening means whereby the said plate 7 is held in place. An air supply pipe 12 is connected at one end to the heater 6 it being open to the space between the outer wall of the conduit 5 and the inner surface of the plate member 7, the opposite end of said pipe 12 being annularly elarged as indicated at 13 to provide for its attachment, by means of a packing nut 14 to an extension 15 of a suitable valve casing 16.

A second or lateral extension 17 is integral with the casing 16, said extension being exteriorly threaded as at 18 to fit a threaded opening 19 of the intake manifold 3, the free end of said extension being cut at a sharp angle and, when in operative position, being disposed interiorly of the said manifold 3 directly in the path of the fuel supply *en route* to the cylinders 2.

The casing 16, as is apparent upon reference to Fig. 2, is hollow, and has arranged therein a valve member 17′, one end of which is shaped to close the bore 18′ of the extension 15 communicating the pipe 12 with the interior of the casing. The opposite end of the casing 16 from that in communication with the said pipe 12 is opened, it being interiorly threaded to receive a nut 19 having a threaded bore 20 into which is fitted an exteriorly threaded extension 21 of a priming cup 22, said extension being provided with a central bore 23 communicating said cup 22 with the interior of said casing. A valve 24, of any suitable type, is operable to open and close communication between said cup and said casing, said valve being preferably arranged to close the bore 23 in the manner shown in the said Fig. 2. Said extension 17 is also provided with a central bore 25 whereby the interior of the casing 16 may be in communication with the interior of the intake manifold 3, from which arrangement, it is apparent that upon movement of the piston within the cylinders 2, the air within the casing 16 is sucked through the bore 25, and, with the fuel supply, drawn into the said cylinders in a manner necessary to operation of the engine.

The heater 6, by reason of its arrangement over the exhaust conduit 5 of the engine, will provide for the utilization of the high temperature of the exhaust or spent gases to heat the air drawn through the pipe 12, through the casing 16, and finally, through the manifold 3 with the fuel supply, to the engine cylinders. Suction alone operates the valve 17, said valve being so shaped or formed as to close automatically communication between the pipe 12 and the interior of the casing when the piston of the engine remains idle.

From the foregoing, taken in connection with the accompanying drawings it will be noted that an auxiliary air supply, heated to a temperature facilitating combustion, is supplied to the intake manifold of the engine, commingled with the fuel supply and conveyed therewith to the engine cylinders; that a priming of the engine may be effected by operation of the valve 24 in a manner obvious upon reference to the drawings; and that an auxiliary air supply is not only admitted, but is properly heated to facilitate combustion, prior to its passage with the fuel supply, into the engine cylinders.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claim.

Having thus fully described my invention, what I claim as new and desire to secure by Letters Patent, is:—

In a controlling valve construction, a casing, an air intake, a priming cup having a bore open to said casing, an outlet for said casing open to the intake manifold of a combustion engine, a valve member in said casing of less diameter than the interior diameter thereof, said valve member normally closing the air intake of said casing, a reduced extension on said valve to close the bore of said priming cup when the valve is unseated from its normal position and said valve being of less diameter than the interior diameter of said casing to permit air to be drawn thereabout to said outlet when in such unseated position; in combination with means to heat the air drawn into said casing through intimacy with the exhaust of the combustion engine.

In testimony whereof I affix my signature in presence of two witnesses.

STERLING E. WILBERGER.

Witnesses:
M. H. MARVIN,
JULES CHIFFELB.